E. CHENEAUX.
VARIABLE SPEED GEARING.
APPLICATION FILED JULY 28, 1911.

1,092,692.

Patented Apr. 7, 1914.
2 SHEETS—SHEET 1.

Witnesses

Inventor
Edouard Cheneaux
Per
Attorney.

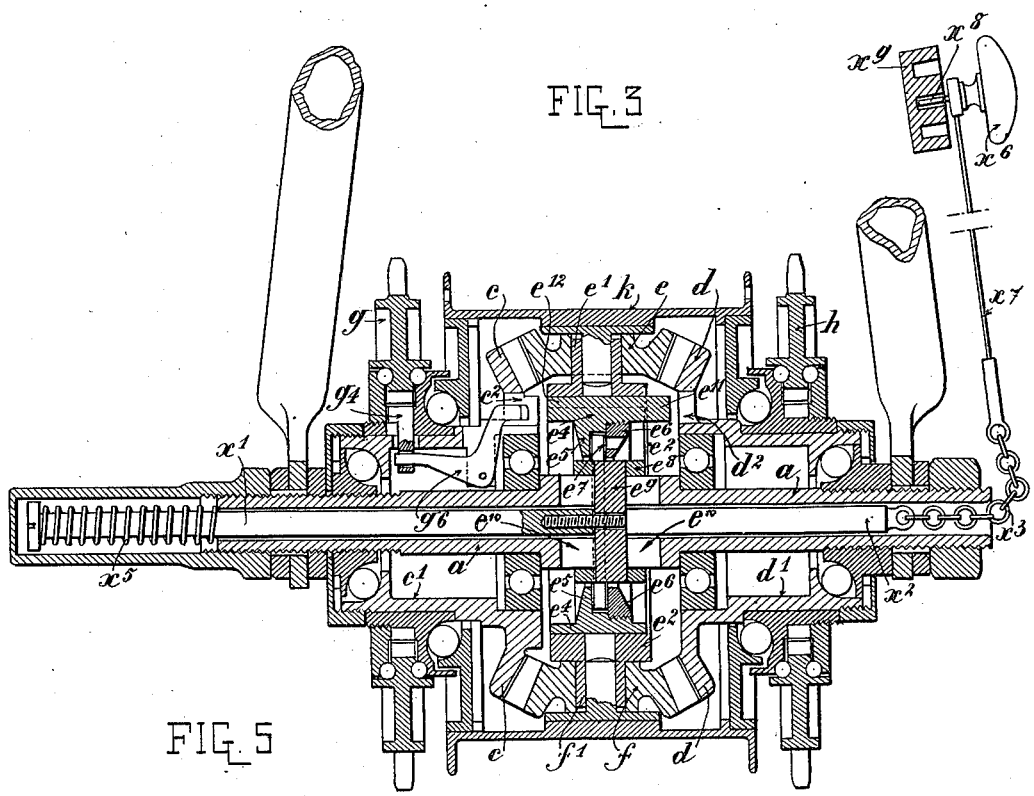
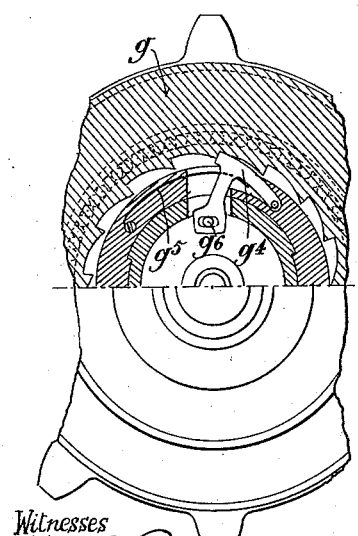
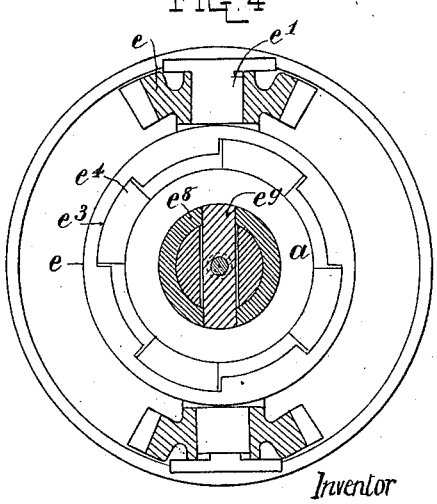

UNITED STATES PATENT OFFICE.

EDOUARD CHENEAUX, OF PARIS, FRANCE.

VARIABLE-SPEED GEARING.

1,092,692.  Specification of Letters Patent.  Patented Apr. 7, 1914.

Application filed July 28, 1911. Serial No. 641,130.

*To all whom it may concern:*

Be it known that I, EDOUARD CHENEAUX, a citizen of the French Republic, residing at 61 Rue St. Maur, Paris, in the Department of Seine, France, have invented a new and useful Improved Variable-Speed Gearing, of which the following is a specification.

The present invention relates to an apparatus for double action change speed gearing, that is to say, having an action either independent or simultaneous or compensating. This arrangement consists essentially in the combination upon a fixed main shaft, of a differential gearing, the two lateral pinions of which are each solid with a receiving organ of a different driving element, and the planetary wheels of the differential gearing have their axes engaged with a drum mounted concentrically upon the principal fixed axle; the said drum is thus brought into rotation at the speed desired in each special case and can serve directly as a working organ (such as hub of a wheel, pulley or the like), or indirectly to transmit the force and the speed received to other organs or machines. Means are provided for permitting the planetary wheels of the differential gearing to revolve or not upon their own axles, and means are also provided for clutching and unclutching one of the receiving organs of the motor driving mechanism independent of the other, or for the clutching or unclutching simultaneously. This arrangement permits of attaining various effects in the reception and utilization of motive driving power, and is susceptible of various applications.

Figure 1:
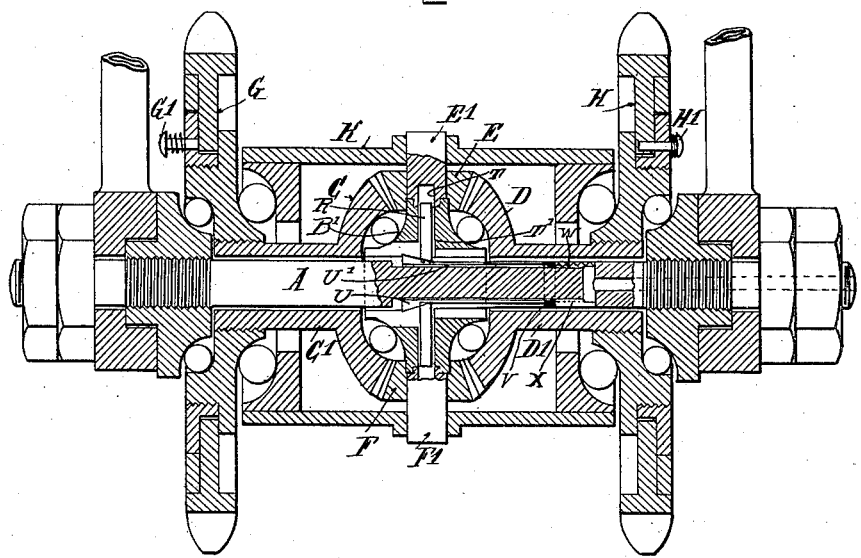
Figure 2:
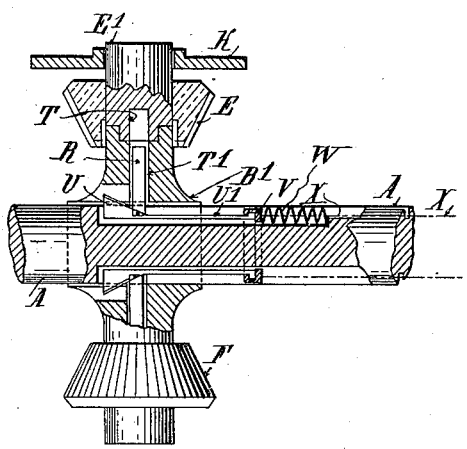

Referring to the accompanying drawing: Figure 1 shows a longitudinal section of a change speed gearing constructed according to this invention, designed especially for application to the hub of a bicycle. Fig. 2 is a detail showing the construction of an apparatus for rendering free or fixing upon their axles the planetary wheels of the differential gearing. Figs. 3 to 5 show a construction of hub adapted for free wheels.

Upon the fixed main axle A there is mounted freely the differential gearing B. This latter includes the side wheels C and D and the planetary wheels E F. The wheel C supported by a sleeve C' is in one piece with a power receiving organ which can, for instance, be the sprocket wheel G. The wheel D on the sleeve D' is likewise united to a similar organ capable of receiving a different speed, for example the sprocket wheel H. The wheels G and H are provided with the respective bolts G', H' whereby they can either be locked to the sleeves C' D' which support them, or be allowed to revolve freely. The planetary wheels E F have their axles E' F' engaging with a drum K which they revolve at the speed and in the direction suitable for each case. This drum serves either directly as a working organ (the drawing shows the drum K forming the hub of a bicycle wheel), or indirectly for transmitting motion to other organs or machines. Moreover the planetary wheels E F of the differential gearing are capable of being locked upon their axles or made free at will by means of a suitable controlling apparatus. For example Fig. 2 shows the planetary wheel E (and a like construction is applicable to F) fixed upon the end of the axle E' which travels around in the drum K on the one side and on the other side in the encircling boss B' traversed by the fixed main shaft A of the apparatus. The holes T T' of polygonal shape pierced in the axle E' and the boss B' are of such a length as to permit of a stud R lodged in the hole T' being displaced so as to engage in the hole T while remaining partly engaged in the hole T' for the purpose of locking the axle E' and consequently the planetary wheel E.

The control of the studs R is effected by a cone U pressing upon the base of the stud R and sliding in a recess of the axle A; the cone U is in one piece with an arched piece U' surrounding the fixed axle and engaging with a ring V moved by a cord or wire X actuated from the outside. The resistance spring W restores the organ to the unclutched position.

The change of speed which has been above described enables the user to attain among other advantages the following effects: 1. If the receiving wheel G is unclutched, the wheel H clutched, and the planetary wheels locked upon their axles, this causes the moving of the drum K at a speed equal to that of the wheel H. 2. If the receiving wheel H is unclutched, the wheel G clutched, and the planetary wheels E F locked upon their axles, this causes the rotation of the drum K at a speed equal to that of the wheel G. 3. If the two wheels G H are clutched and the auxiliary wheels E F free, the drum K is rotated at a compensated speed, that is to say, the differential gearing B permits each receiving wheel G H to revolve according to its own speed the respective pinions C D; the compensation of the two speeds being effected by the planetary motion of the pinions E F. In this manner three different speeds are obtained in the transmission to the drum K, and it is obvious that by aid of a similar mechanism applied to the transmission motor it becomes possible to produce there also three variations of speed and thus increase the number of speeds transmissible to the hub or drum K, making a total combination of five speeds in all. This mechanism for change of speed is susceptible of practically infinite applications, but in the special case of its application to the bicycle, it permits of constructing a bicycle with double chain transmission mechanism in which the driving strains coming from one pedal mechanism to two independent sprocket wheels are compensated by means of the differential gearing interposed.

Referring to Figs. 3 to 5 of the drawing, upon the principal fixed axle $a$ there is mounted freely the differential gearing composed of the lateral gears $c$ and $d$ and the satellites $e$ and $f$. The wheel $c$ is rigidly connected to a sleeve $c'$ which bears the free sprocket wheel $g$. The wheel $d$ is fixed on a sleeve $d'$ which bears the free sprocket wheel $h$. The satellites $e$ $f$ are mounted loose upon the axles $e'$ $f'$ carried by the fixed crown $e^2$ having internal notches $e^3$ into which notches there can engage a clutch crown $e^4$ provided with projections corresponding to the notches $e^3$. This crown $e^4$, engages by a heel piece $e^5$ and a ring $e^6$, the collar $e^7$ of a projection $e^8$ mounted upon the shaft $a$ and prevented from revolving by a key $e^9$ which passes through this axle and can slide in a longitudinal slot $e^{10}$. The axle $a$ is tubular and through it there passes a controlling rod formed in two parts $x'$ $x^2$ screwed one to the other and engaging the key $e^9$. A little chain $x^3$ attached to the said rod at $x^2$ and connected to the controlling handle enables the user to move the key $e^9$ in its slide $e^{10}$ against the action of the spring $x^5$. The key $e^9$ carries with it on being displaced lengthwise the clutch crown $e^4$ which is provided laterally with projections, of which those on the right hand $e^{11}$ are for engagement in the recesses $d^2$ of the wheel $d$, while the others on the left hand $e^{12}$ are to engage with the recesses $c^2$ in the wheel $c$. In the one case as also in the other the differential gearing is locked and the satellites $e$ $f$ are fixed upon their axles. The part $k$ is then caused to rotate at the speed of the wheel $g$ or of the wheel $h$ according as the one or the other side is clutched.

If it be assumed that the wheel $g$ is the high speed wheel then it will be necessary to render it free when the wheel $h$ is to carry with it the hub. For this purpose the dog $g^4$ of the free wheel $g$ subject to the action of its spring $g^5$ is put out of action by means of the oscillating piece $g^6$ when the crown $e^4$ engages by means of its projections $e^{12}$ in the notches $c^2$ of the wheel $c$. By means of this combination of parts the same results are obtained as those illustrated by Figs. 1 and 2. Under the action of the spring $x^5$ the key $e^9$ is moved to the left in its groove $e^{10}$. It carries with it the clutch crown $e^4$ and at the same time effects the stoppage to the left of the differential gearing by the engagement of the projections $e^{12}$ in the recesses $c^2$ and the unclutching of the wheel $g$ which becomes free; the hub $k$ is then rotated at the same speed as that of the free wheel $h$.

By drawing the little chain $x^3$ the key $e^9$ is moved toward the right to bring it into its middle position (as shown in Fig. 3), and this motion liberates the differential gearing and permits the wheel $g$ to again become a free wheel; in this position the hub is rotated at a compensated speed according to the difference of speeds received by the wheels $g$ and $h$. By further drawing the chain $x^3$ the fixing on the right of the differential gearing is effected; the part $c^4$ engaging its projection $e^{11}$ in the recesses $d^2$ of the wheel $d$ thereby causing the hub to be rotated at the speed received by the free wheel $g$. The little chain $x^3$ is connected to the controlling handle $x^6$ by means of the cable or rod $x^7$ which can be locked in three positions by a stop $x^8$ engaging in the notches of the bolting piece $x^9$.

What I claim is:

1. In a change speed gearing, the combination of a pair of driving sprockets, a hub, a differential gearing, members of which are connected to said hub and driving sprockets respectively, connecting members between said sprockets and said differential gearing and between the planet pinions of the latter and the bosses upon which these pinions are rotatable, operable for obtaining different speeds.

2. In a change speed gearing, the combination of an axle, two sun wheels mounted by means of sleeves to freely rotate thereon, two sprocket wheels adapted to be clutched or unclutched as desired to their respective sun wheels, a hub, a pair of planet wheels mounted on said hub and in engagement with said sun wheels, and means for locking and unlocking said planet wheels as regards rotation about their own axes.

3. In a change speed gearing, the combination of an axle, two sun wheels mounted to rotate freely on said axle, a pair of driving sprockets mounted on said sun wheels, means for clutching and unclutching each sprocket wheel to one of said sun wheels independently of the other, a pair of planet wheels, a hub, a spindle on said hub, and means for locking and unlocking said planet wheels as regards rotation about their own axes.

4. In a change speed gearing the combination of a hollow axle, two sun wheels having sleeves whereby they may run freely on said axle, a pair of driving sprockets mounted on the sleeves of said sun wheels, means for clutching and unclutching either sprocket wheel to its sun wheel independently of the other, a hub, spindles on said hub, two planetary wheels on said spindles, a controlling rod within said axle, means for displacing said rod relatively to said axle, and clutches on said rod adapted to connect said sun wheels to said spindles on the hub.

5. In a change speed gearing the combination of a hollow axle, two sun wheels, two sprocket wheels, clutch members between said sun wheels and said sprocket wheels, a hub, spindles on said hub, planet wheels mounted on said spindles, clutch members adapted to rigidly connect said planet wheels to said spindles, an operating rod mounted within said hollow axle and adapted to operate said clutch members, a retaining spring on said operating rod, an operating handle, means for retaining said handle in the desired position, and connecting means between said handle and said operating rod.

In testimony whereof I have signed my name to this specification in the presence of two subscribing witnesses.

EDOUARD CHENEAUX.

Witnesses:
PAUL CAQUET,
H. C. COXE.

---

Copies of this patent may be obtained for five cents each, by addressing the "Commissioner of Patents, Washington, D. C."